US008788942B2

(12) United States Patent
Jain et al.

(10) Patent No.: US 8,788,942 B2
(45) Date of Patent: Jul. 22, 2014

(54) ENTERPRISE SOCIAL NETWORKING SOFTWARE ARCHITECTURE

(75) Inventors: Sandhya D. Jain, Redmond, WA (US); Ning Jiang, Redmond, WA (US); Gary L. Caldwell, Redmond, WA (US); Donald A. Ramsay, Jr., Mercer Island, WA (US); Gail Borod Giacobbe, Seattle, WA (US); Venkatesh Veeraraghavan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1004 days.

(21) Appl. No.: 12/040,622

(22) Filed: Feb. 29, 2008

(65) Prior Publication Data

US 2009/0222750 A1 Sep. 3, 2009

(51) Int. Cl.
 *G06F 3/0484* (2013.01)
(52) U.S. Cl.
 USPC ........... 715/733; 715/745; 715/751; 715/765; 715/971
(58) Field of Classification Search
 USPC .......................... 715/733, 745, 751, 765, 971
 See application file for complete search history.

(56) References Cited

U.S. PATENT DOCUMENTS

| | | | |
|---|---|---|---|
| 6,023,572 A | 2/2000 | Lautzenheiser et al. | |
| 6,467,052 B1 | 10/2002 | Kaler et al. | |
| 7,058,953 B2 | 6/2006 | Willard et al. | |
| 7,206,789 B2 | 4/2007 | Hurmiz et al. | |
| 7,249,148 B2 | 7/2007 | Ehrich et al. | |
| 7,293,083 B1 | 11/2007 | Ranous et al. | |
| 7,801,971 B1 * | 9/2010 | Amidon et al. | ............... 709/217 |
| 2002/0091636 A1 | 7/2002 | Carroll Bullard | |
| 2002/0091811 A1 | 7/2002 | Schweitzer et al. | |
| 2003/0050976 A1 * | 3/2003 | Block et al. | ................... 709/203 |
| 2004/0122943 A1 | 6/2004 | Error et al. | |
| 2006/0041460 A1 | 2/2006 | Aaron | |
| 2006/0121988 A1 | 6/2006 | Reville et al. | |
| 2007/0016609 A1 | 1/2007 | Kim et al. | |
| 2007/0088832 A1 | 4/2007 | Tsang et al. | |
| 2007/0198943 A1 | 8/2007 | Grason et al. | |
| 2007/0204308 A1 | 8/2007 | Nicholas et al. | |
| 2008/0010319 A1 | 1/2008 | Vonarburg | |
| 2008/0040475 A1 | 2/2008 | Bosworth et al. | |
| 2008/0040673 A1 | 2/2008 | Zuckerberg et al. | |
| 2009/0031232 A1 | 1/2009 | Brezina | |
| 2009/0222448 A1 | 9/2009 | Caldwell | |
| 2011/0219089 A1 * | 9/2011 | Robertson et al. | ............ 709/206 |

OTHER PUBLICATIONS

A Conceptual Framework for Business Intelligence Based on Activities Monitoring Systems (16 pages) http://www.inderscience.com/storage/f741226813591011.pdf.

(Continued)

*Primary Examiner* — Namitha Pillai
(74) *Attorney, Agent, or Firm* — Rachael Vaughn; David Andrews; Micky Minhas

(57) ABSTRACT

An enterprise-based social networking application. Events for individuals may be collected from various enterprise-based information systems automatically using adaptors that are specially tailored for particular types of information systems. Such events may then be used to populate event feeds regarding individuals in that enterprise. A filtering model for formulating event feeds identifies events by individual, event type, and event time. The filter also identifies which individuals are in which group of a participant, and identifies which groups correspond to which event types. Incoming events may then be filtered into the event feeds depending on the group to which the individual belongs. A user interface for a participant to view and edit group membership is also provided.

21 Claims, 9 Drawing Sheets

(56) References Cited

OTHER PUBLICATIONS

Web-Based Enterprise Management Architecture (7 pages) http://ieeexplore.ieee.org/iel3/35/14500/00663331.pdf.

Supporting Enterprise Knowledge Management with Weblogs (54 pages) http://oriol.joor.net/article_fitxers/1550/Blogs%20corporatius.pdf.

At the Crossroads of Knowledge Management and Social Software (10 pages) http://www.ejkm.com/volume-4/v4-i1/Avram.pdf.

Towards Integrative Enterprise Knowledge Portals (8 pages) http://www.database.cis.nctu.edu.tw/seminar2004/_private/20040811/%E9%99%B3%E4%BF%A1%E6%BA%90/Towards%20integrative%20enterprise%20knowledge%20portals.pdf.

My Best Day: Presentation of Self and Social Manipulation in Facebook and IM (50 pages) http://www.american.edu/lfs/tesol/My%20Best%20Day.pdf.

U.S. Appl. No. 12/040,628, Dec. 8, 2009, Office Action.

U.S. Appl. No. 12/040,628, Jun. 8, 2010, Office Action.

Office Action dated Dec. 6, 2012 cited in U.S. Appl. No. 12/040,628.

Office Action dated Dec. 20, 2011 cited in U.S. Appl. No. 12/040,628.

Office Action dated Jul. 30, 2012 cited in U.S. Appl. No. 12/040,628.

Office Action dated Jun. 18, 2013 cited in U.S. Appl. No. 12/040,628.

* cited by examiner

US 8,788,942 B2

ENTERPRISE SOCIAL NETWORKING SOFTWARE ARCHITECTURE

BACKGROUND

Computer networking technologies have enabled a wide variety of applications such as, for example, Web surfing, e-mail, instant messaging and the like. One particularly promising and popular application is social networking. Social networking is conventionally internet based. Thus, anyone in the public can typically have some access to the social networking application.

Social networking typically allows people to share information about themselves with others. In one implementation, each social networking participant might have their own network site where they can post information about themselves. Some of this information might be available to anyone with access to the Internet-based social networking application.

Social networking allows for the formulation of a tighter network of friends, wherein each friend is permitted to have more information regarding the participant in the form of an event feed. Initially, the participant does not have an electronic social network of friends. To establish a social friends network, the participant must find other participants who are willing to become friends. The participant would then send an electronic invitation to an invitee to become the participant's friend. If the invitee accepts the invitation, then the invitee would be added to the participant's network of friends.

Conventionally, this friends network is reciprocal. For instance, if participant B were to receive and accept a friendship invitation from participant A, participant A would become part of participant B's friend network, and participant B would become part of participant A's friend network.

Someone in a participant's friend network may receive more information regarding that participant in the form of news or event feeds regarding others in that network. The participant themselves generates the event feed by interfacing directly with the social networking application. For instance, if the participant adds a new photograph, that event might be entered into the event feed. If the participant enters a travel log entry, that log entry might be entered into the event feed. There are a wide variety of other events that might be entered into the event feed, but the population of the event feed is largely, if now wholly, in response to participant activity.

Thus, social networking applications enable individuals to establish networks and keep others informed. Nevertheless, effort and mutual collaboration is required in order to formulate networks. Furthermore, a participant must attend to interfacing with the social networking application if the event feed regarding that participant is to be kept rich with information, and up-to-date.

BRIEF SUMMARY

Some embodiments described herein relate to a mechanism for collecting events regarding individuals into an events pool so that the events pool may be used to formulate event feeds regarding those individuals. The event feeds may then be provided to participants in an enterprise-based social networking application. The mechanism includes a collector module that uses configuration information to instantiate and support a number of adaptor modules. Each adaptor module is configured to collect events regarding individuals from a particular kind of information system. The adaptors add such events to the events pool. Accordingly, at least some of the events in the events pools may be automatically populated by examining enterprise-based information systems, rather than by requiring that the individuals interface directly with the social networking application.

Some embodiments relate to the model for preparing to provide the event feed to a participant in the social networking application. The model involves tracking events as they are extracted from the events pool by identifying an individual, an event type, and a time for each event. An event feed construction module records a group membership for each of multiple groups of the participant. A filtering mechanism decides for each group, which event types are to be fed to the participant when detecting events regarding individuals in that group.

Some embodiments described herein relate to a user interface for presenting the groups to the participant, and allowing the participant to change group memberships. The user interface includes a representation for each group belonging to that individual. Individuals within the group are shown associated with (e.g., within) the representation of the corresponding group. The user interface also includes an input mechanism that permits the participant to edit the group membership.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of embodiments thereof is illustrated in the appended drawings. Understanding that these drawings depict only example embodiments of the invention and are not therefore to be considered to be limiting of its scope, the embodiments will be described and explained with additional specificity and detail through the use of the accompanying drawings in which.

DETAILED DESCRIPTION

In accordance with embodiments described herein, an enterprise-based social networking application is described.

Events for individuals may be collected from various enterprise-based information systems automatically using adaptors that are specially tailored for particular types of information systems. Such events may then be used to populate event feeds regarding individuals in that enterprise. A filtering model for formulating event feeds identifies events by individual, event type, and event time. The filter also identifies which individuals are in which group of a participant, and identifies which groups correspond to which event types. Incoming events may then be filtered into the event feeds depending on the group to which the individual belongs. A user interface for a participant to view and edit group membership is also provided.

First, a basic computing system will be described with respect to FIG. 1. Then, various embodiments and uses of the enterprise-based social networking application will be described with respect to FIGS. 2 through 11.

Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Figure 1:
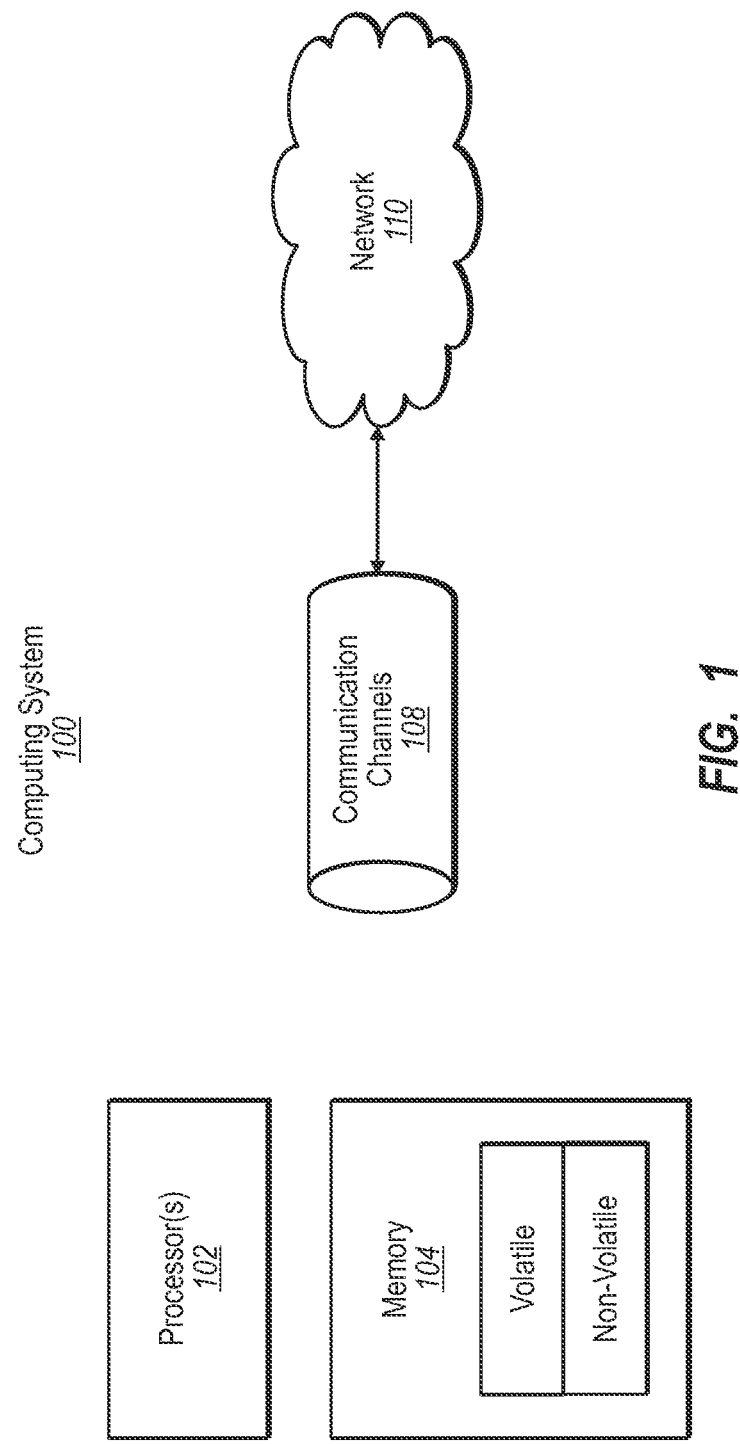
FIG. 1 illustrates a example computing system that may operate to transmit streaming data.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
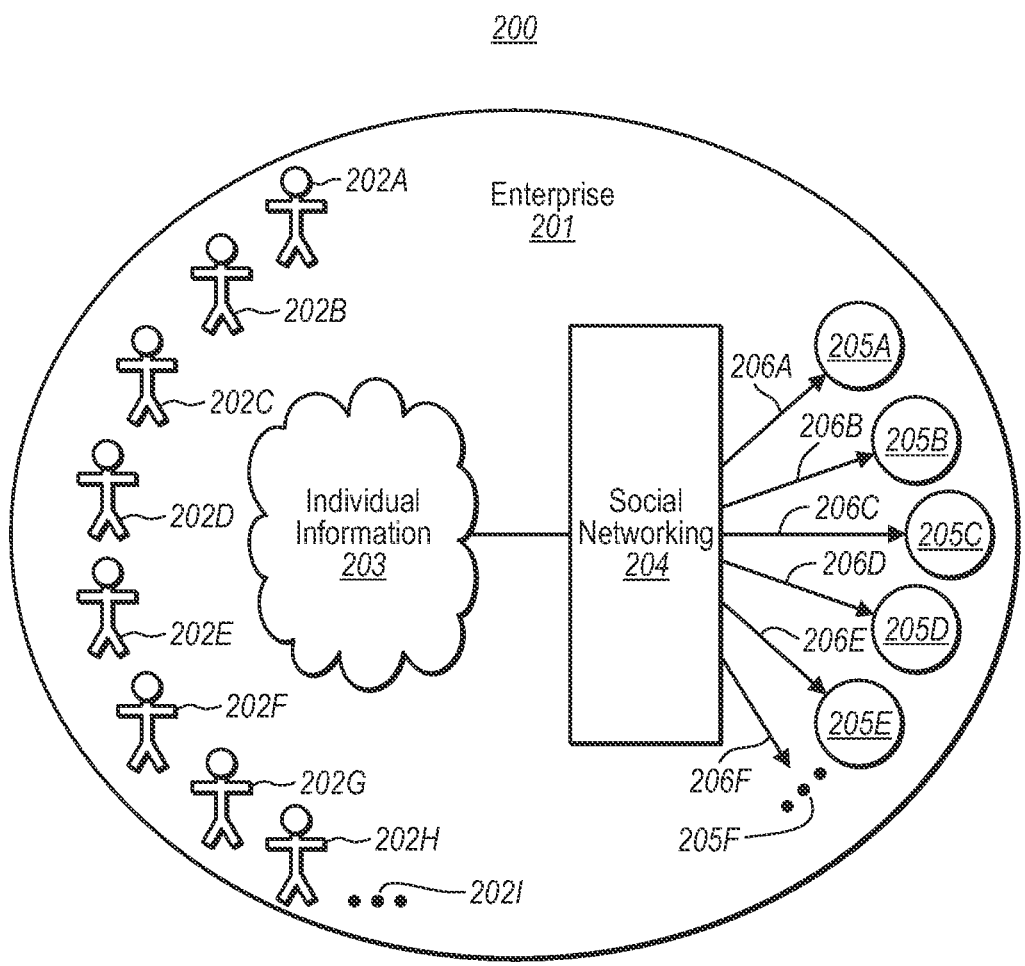
FIG. 2 illustrates an enterprise environment in which a social networking applications may operate.

FIG. 2 illustrates an example environment 200 in which embodiments described herein may operate. The environment 200 might include, for example, an enterprise 201. For instance, the enterprise 201 might be a corporate or other organization. The enterprise might include an intranet that is protected from the remainder of the Internet via some trust barrier such as a firewall.

The enterprise 201 includes individuals 202A through 202H that belong to the enterprise and engage in activities within the enterprise. There are 8 such individuals 202A through 202H shown, although a typically enterprise might typically have many more individuals as represented by the ellipses 202I. The individuals might collectively be referred to as "individuals 202". As an example, in a corporate environment, the individuals may be employees of the corporation. As these individuals operate within the enterprise, information regarding these individuals is accumulated by the enterprise. Such information is represented by individual information 203 in FIG. 2.

The enterprise 201 includes a social networking application 204. The social networking application may be run on a computing system 100 as shown as described with respect to FIG. 1. Such a computing system may be a single computing system, or may be distributed. One of the functions of the social networking application is to provide event feeds 206A through 206F to participants 205A through 205F. Although five participants 205A through 205E are shown in FIG. 2, the ellipses 205F is used to represent that the social networking application 204 may have any number (one or more) of participants receiving event feeds. The participants 205A through 205F might collectively be referred to as "participants 205".

The social networking application 204 may be somewhat asymmetric. In order to understand how, this description will now describe some of the characteristics of the individuals 202 as compared to the participants 205. The individuals are people operating either external to or within the context of the enterprise 201. The individuals 202 may, but need not, interface and interact with the social networking application 204. For instance, perhaps individuals 202C, 202D and 202E are also participants 205, but individuals 202A, 202B, 202F, 202G, and 202H are not. Regardless, the enterprise accumulates information regarding the individuals 202.

In this description and in the claims, the term "topic individual" will be used frequently. That term is used to describe an individual regarding which information or events may be regarding. Accordingly, each event will have a "topic individual" that is the subject of the event. For instance, the social networking application 204 tracks events for various topic individuals 202. Such events might include anything that a participant might find interesting. Examples of events might be that the topic individual has added a picture to a profile, a blog or travel entry for the topic individual, that the topic individual has stepped out for lunch but will return at 1:00 pm, that the topic individual has a birthday coming up, that the topic individual has received a promotion, and so forth.

The participants 205, on the other hand, do interface with the social networking application 204. The participants 205 each register with the social networking application and receive an event feed regarding particular topic individuals. For instance, participant 205A might receive event feeds for individuals 202A, 202F and 202G; participant 205B might receive event feeds for individuals 202B, 202C and 202F; and so forth. The social networking application keeps track of which topic individuals each participant is to receive an event feed for. In one embodiment, for each participant, the social networking application categorizes the topic individuals into groups, where the event types for each group differs depending on the group in which a topic individual appears.

Although the individuals 202 are each illustrated as being within the enterprise 201, it is possible that one or more of the individuals 202 may not be part of the enterprise at all. Nevertheless, the information regarding the topic individuals may be much richer if the individual 202 is a member of the enterprise and engage in enterprise processes. Furthermore, although the participants 205 are illustrated as being within the enterprise 201, it is possible that one or more participants 205 may be external to the enterprise 201. Nevertheless, when all individuals 202 and participants are within a common sphere of trust, the conveyance of information regarding activities engaged in within that sphere of trust may be much richer and shared with greater confidence.

Accordingly, the social networking application 204 serves as an information broker that provides a centralized point where participants can obtain information regarding other individuals in the enterprise.

Figure 3:
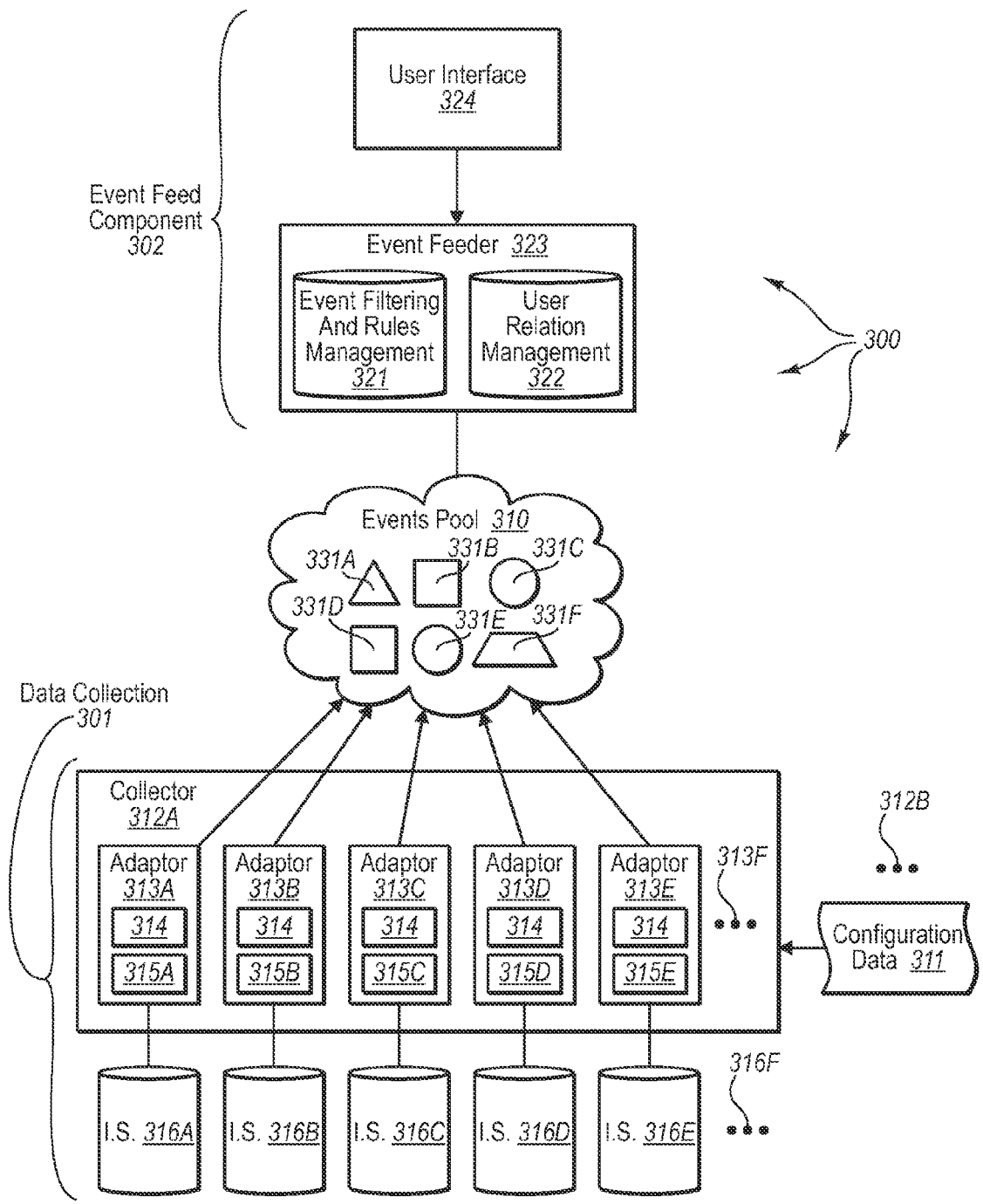
FIG. 3 illustrates an information flow involved with the automated gathering of events regarding topic individuals, and formulating event feeds for those events.

FIG. 3 illustrates an environment 300 in which an enterprise-based social networking application may operate. The environment 300 includes three basic components, a data collection component 301, an events pool 310, and an event feed construction and presentation component 302. The data collection component 301 searches through various information systems for events related to topic individuals, and provides those events into the events pool 310. The event feed construction and presentation component 302 formulates event feeds for participants, and presents the event feed to those participants. The events pool 310 serves as a repository for events regarding the topic individuals.

The illustrated data collection component 301 will now be described in further detail The data collection component 301 includes one or more collector modules. One collector module 312A is illustrated, although there may be others as represented by the horizontal ellipses 312B. Each collector module serves as a container for one or more adaptors. In other words, the container 312A serves as an execution environment for the adaptors providing information as needed to the various adaptors, and controlling when the adaptors start and stop. In order improve timeliness in delivering fresh events regarding topic individuals, each adaptor might run on a separate thread.

Each adaptor is configured to extract events regarding topic individuals from a distinct kind of information system (also referred to herein as an "information source"). In a typical enterprise, as an individual engages in normal enterprise activity, various information may be accumulated regarding that individual's activity. Such information is rarely accumulated in any single information system of any single type. Rather, more typically, there may be information regarding topic individuals in various information systems. The use of adaptors permits for event extraction across various types of information systems, where each adaptor is configured to extract events from a particular kind of information system.

For instance, adaptor 313A is configured to extract events regarding topic individuals from information system 316A which is a particular type of information system. Adaptor 313B is configured to extract events regarding topic individuals from information system 316B, and so forth for the remainder of adaptors 313C through 313E and information systems 316C through 316E. Likewise, other adaptors (represented by horizontal ellipses 313F) may be used to extract events from yet other information systems 316F. Although the adaptors may each be different types of adaptors to extract events from different information systems, that need not always be the case. For example, two or more of the adaptors may be the same type of adaptor. Instantiating multiple adaptors for the same information system type might be helpful in order to obtain events in a timely manner, and/or perhaps to obtain events for distributed information systems.

The information systems 316A through 316F (referred to collectively as "information systems 316") might include a wide variety of different types. The principles described herein are not limited to the type of information system. Nevertheless, to illustrate a particular example, various types will now be described.

One information system might be, for example, an administrative human resource system. That system might include when an individual was hired, from which information an adaptor might determine whether or not a hiring anniversary is approaching. That system might also include a birthday for topic individuals, when there is a status change (e.g., promotion or other title change), and may also include information regarding the placement of the topic individuals within the organizational context of the enterprise.

Another information system might be an enterprise directory and general attribute repository system such as, for example, ACTIVE DIRECTORY®. Such a system might also include titles, office numbers, organization context, and so forth, of various topic individuals.

Yet another information system might be a user profile site into which the topic individual may enter information about himself or herself. In that profile site, one might declare various attributes about oneself (e.g., special interests), share files, upload photographs, and so forth.

Another information system might be an instant messaging status which includes a status indicator that indicates information regarding the topic individuals, and may include entries made by a topic individual regarding availability (e.g., "I will be at a client until 4:30 pm.—then working from home thereafter").

Other information systems might include enterprise calendar systems (such as Exchange), document management systems, financial systems, and so forth. The types of information systems has no limit, and may include information systems that are now existing, or yet to be developed. Once a new information system is encountered, the information system may be incorporated into the data collection module 301 by authoring an appropriate adaptor.

To facilitate the effective authoring and generation of additional adaptors as new information systems come into being, the adaptors may be constructed as a plug-in component with a pre-constructed framework for the adaptors already preexisting. For instance, each adaptor 313 includes common services 314 that may be part of that adaptor framework. Then, in order to introduce a proper adaptor for a particular information system, only the custom functions used to interface with the information system would need to be authored.

Examples, of common services include 1) the procedures for connecting with the events pool 310, and placing an event into the events pool 310, 2) the procedures for discovering the identity of the topic individuals for which events are desired, 3) logging functionality, 4) an Application Programming Interface (API) with the collector so that collector can start and stop the adaptor, 5) state persistence, 6) other system standard interactions with the system, and the like. For instance, each of the adaptors 313A through 313E might include this common functionality 314.

Each adaptor 313A through 313E also includes specific functions 315A through 315E. These specific functions include the logic used to determine the types of queries to be made to the information system, and includes the knowledge of the appropriate Application Program Interface (API) to use to property interface with the corresponding information system.

In FIG. 3, the collector module 312A contains five illustrated adaptors 313A through 313E amongst potentially and possible less as represented by the horizontal ellipses 313F. Although one collector module may suffice, it may be advantageous in some circumstances to have more than one collector module. For instance, multiple collector modules may be used in order to extract events from the various information systems in a more timely manner. Also, multiple collector modules may be used to accommodate various network topology and expanded geographical distributions.

The configuration data 311 directs the collector module 312A in operation. For instance, the configuration data 311 may define which adaptor modules (e.g., adaptor modules 313A through 313F) the collector module 312A is to instantiate and support. Each adaptor may be configured to respond to the collector's instruction to gather events. The configuration data 311 may also define when the adaptors are to run. The collector module 312A may respond to this configuration data 311 to cause the adaptors to be started and stopped at the appropriate moments. In one embodiment, the adaptors are run on periodic time intervals, where those time intervals may differ depending on the information system.

Once the adaptors 313 retrieve events, those events are provided into an events pool 310. In one embodiment, the events pool 310 is a database. The events pool 310 of FIG. 3 is illustrated as including six events 331A through 331G. In actual implementation, the events pool 310 may include thousands, and even millions of events. In a large enterprise, the events pool 310 might even include billions of events. Nevertheless, in order to avoid unnecessarily complicating the example, only six events 331A through 331G are illustrated.

The events may be of different types. To symbolize this principle, each event illustrated within the events pool 310 is shown as being a shape. For instance, event 331A is shown as a triangle to illustrate that this event is of one particular type. Event 331B is shown as a square to illustrate that this event is of another particular type, which happens to be the same type as event 331D, which is also illustrated as a square. Event 331C is shown as a circle to illustrate that this event is of yet another particular type, which happens to be the same type as event 331E, which is also illustrated as a circle. The event 331F is illustrated as a parallelogram to illustrate that this event may be of yet another type.

Figure 4:
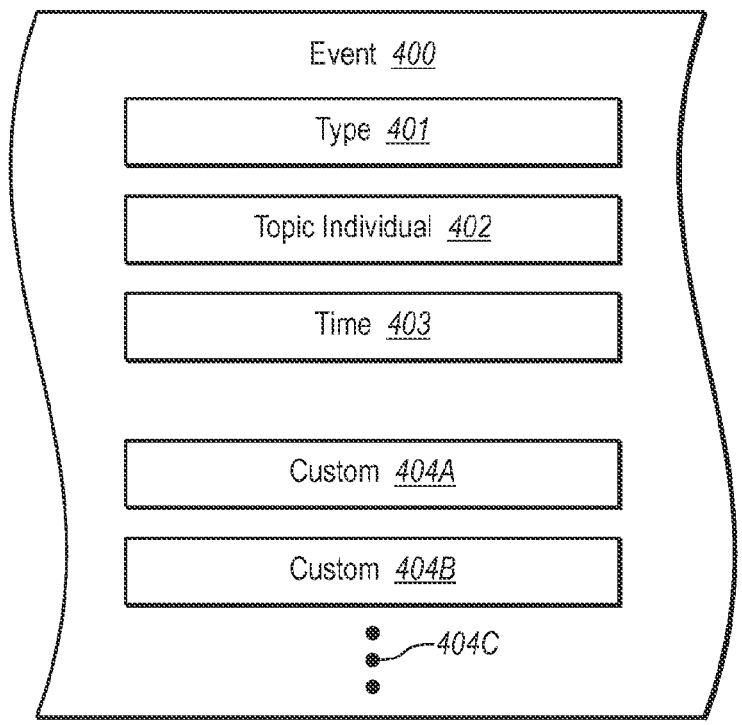
FIG. 4 illustrates an event data structure.

FIG. 4 schematically illustrates an event 400. If the event 400 is a data structure, the various components of the event may be fields within or associated with that data structure. On the other hand, if the event 400 is represented in a database, the various components of the event 400 might be simply represented relationally in that database. Referring to FIG. 4, each event 400 might include several common components such as an event type 401, a topic individual 402, and an event time 403. The events may be categorized into any types that make logical sense, or which may be suitable in defining granularity in the event feed. For example, one event type might be a hiring anniversary, and another might be a birthday. Other event types might be blog entries, title changes, manager changes, profile changes, and so forth. The event type field 401 identifies this type.

The topic individual field 402 identifies the topic individual for the event. For instance, in the environment 200 of FIG. 2, the topic individual field 402 might identify which topic individual 202 the event is about.

The event time field 403 identifies a time that the event occurred. The event time field 403 may be used for sorting the order of the event in the event feed.

The event 400 is also shown as including custom fields 404A, 404B amongst potentially others as represented by the ellipses 404C. Such custom fields may include any information that is appropriate given the specific type of events. For instance, for a manager change event, a custom field might include the name of the manager, another might be the title of the manager, and so forth. For a document change event, the custom field might identify the document and its location, and perhaps describe the nature of the change.

In one embodiment, the events pool 310 may be configured to perhaps discard events after a certain time in order to balance event storage capability with the security of keeping events. For instance, the events pool 310 might keep events for 30 days or some other configurable time period. An events garbage collector might operate in the background to discard older events as they exceed the recycle time. In one embodiment, certain types of events may be kept for different periods of time. For example, birthday event types might be discarded after a shorter lifetime than document change notifications. Accordingly, the event retention policy may be configured as deemed appropriate.

As will be described in greater detail below, the event feed presentation component extracts events from the events pool in order to present an event feed regarding particular topic individuals to the appropriate participant. The event feed presentation component 302 uses the events pool 310 in order to populate the event feed. Accordingly, if the topic individuals were to change for a particular participant, and/or if the type of event to be included in the event feed were to change, that change would be very quickly reflected in the event feed. After all, all of the events regarding all possible topic individuals may be included within the events pool 310. Thus, there would be little lag in repopulating the events pool. Rather, the only lag in presenting the new event feed to the participant would be in extracting the correct events from the events pool. Accordingly, participants may quickly see how a filtering change would change the event feed, and may thus quickly refine the filtering configuration that the participant would like to see.

The event feed generation and presentation component 302 includes an event feeder component 323 and a user interface 324. The event feeder component 323 determines for any given participant which topic individuals the participant is interested in, and which event types the participant is interested in for each topic individual. The event feeder component 323 then generates the appropriate event feed and provides the event feed to the user interface 324 for presentation to the participant. The event feeder component 323 may be performing this function for a larger number of participants, each participant having there own user interface 324.

Figure 5:
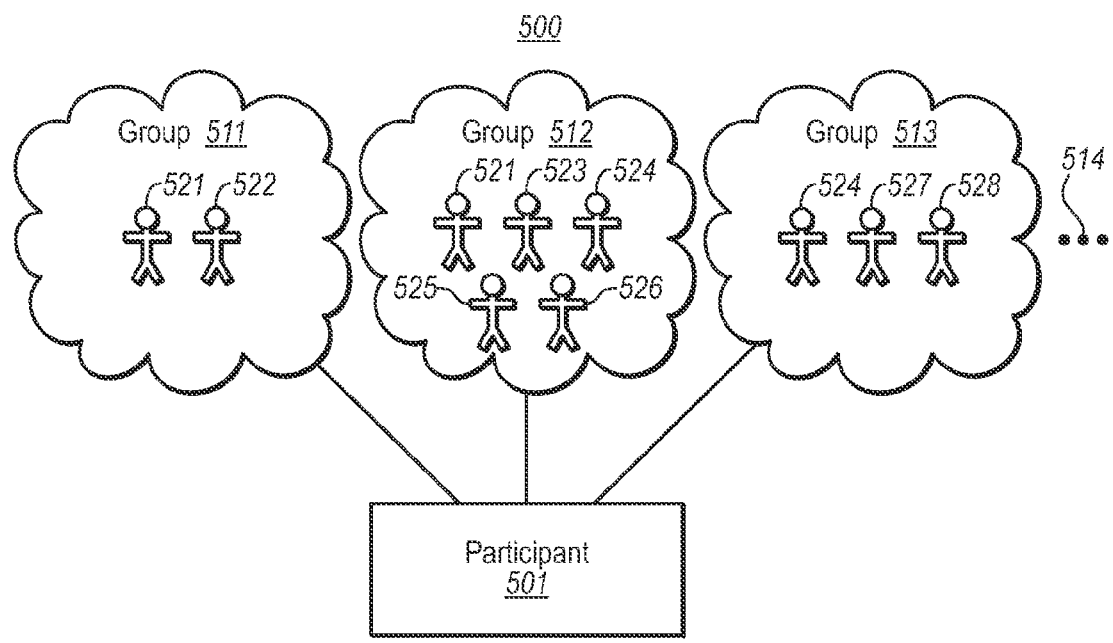
FIG. 5 illustrates a participant that has three social groups of topic individuals.

The event feeder component 323 includes an event filtering and rule management component 321 and a user relation management component 322. The user relation management component 322 designates which topic individuals are in which group for any given participant. FIG. 5 illustrates an example of a user relation 500 between a single participant, three groups, and topic individuals contained within each group.

In the example of FIG. 5, user management data regarding participant 501 is shown. The user relation management component 322 may include such user relation data for each participant in the social networking application. However, to keep the example straightforward, only user relation data for one participant is shown. The participant 501 is shown as including three groupings of topic individuals 511, 512 and 513. Group 511 includes topic individuals 521 and 522. As an example, perhaps group 511 includes the participant's designated friends at work. Group 512 includes topic individuals 521, 523, 524, 525 and 526. As an example, perhaps group 512 includes the participant's designated co-workers. Note that topic individuals may appear in more than one group. For instance, topic individual 521 appears in both groups 511 and 512. Group 513 includes topic individuals 524, 527 and 528. Once again, a topic individual 524 appears in two groups 512 and 513. As an example, the group 513 may represent other individuals of interest.

The horizontal ellipses 514 represents that there may be more or less that the three illustrated groups. For example, there may be another group that includes topic individuals that report directly to the participant 501. In one embodiment, the event feed rules for each topic individuals in any given group are the same. In other words, it is the group into which the topic individual is represented that governs the types of events that are to be included in the event feed regarding that topic individual that is reported to the participant 501.

Figure 6:
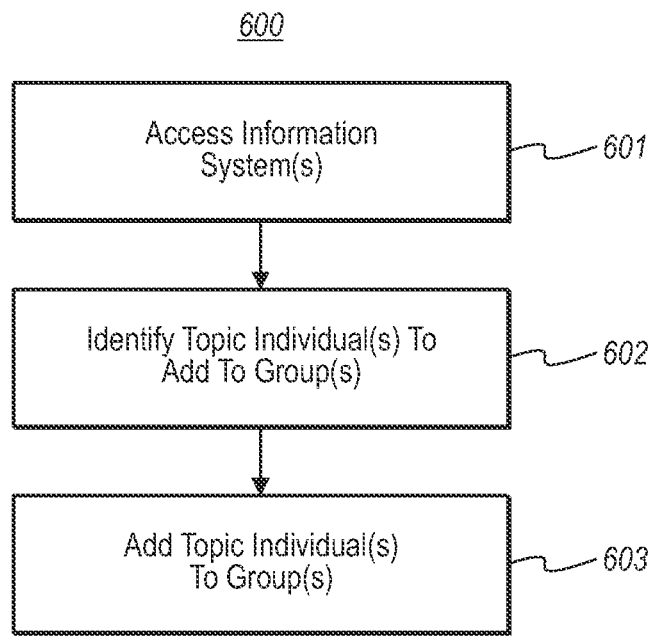
FIG. 6 illustrates a flowchart of a method for formulating a default membership in the group of a participant.

The user relation management component 322 may optionally construct a default user relation for a given participant. This may be accomplished by consulting the same information systems 316 that the adaptors 313 extract events from. FIG. 6 illustrates a flowchart of a method 600 for formulating a default membership in the group of a participant.

First, the user relation management component 322 accesses (directly or indirectly) one or more enterprise information systems (act 601). Then, one or more individuals are selected to be included within a particular group based on the accessed information (act 602). Finally, the default grouping for the participant is formulated that includes the selected topic individuals (act 603).

As an example, the user relation management component 322 may evaluate one or more information systems to identify an organizational context for the participant. The user relation management may then automatically add any individuals that work in the same technical group as the participant to the participant's co-workers group. The user relation management component 322 may also examine the communication history (e-mail and instant messaging perhaps) to see who the participant has been communicating with in the past. The user relation management component 322 may then automatically add those individuals to the participant's friends at work group.

This formulation of a default network differs substantially from the current model in social networking that requires mutual collaboration in order for any topic individual to be added to a participant's network. Conventionally, in order to add an individual to a friends network, an invitation is first sent by the participant, and the recipient then accepts the invitation. They are then both mutually added to each other's network. This model also differs in at least two other significant ways. First, a topic individual can be added to a participant's network without the participant being added to the topic individual's network. Second, the participant has the option of categorizing topic individuals in more than one group.

The user relation management component 322 may also adjust this user relation for a participant when a participant removes or adds a topic individual to a particular group. Once again, this may be performed unilaterally by the participant without the topic individual accepting an invitation to join the group. The participant may be able to view their current user relations, and also make adjustments through the user interface 324.

In one embodiment, the user relation management component 322 may suggest changes in the user relations for a particular participant. For instance, upon detecting that a participant is communicating much more with a particular individual, the system may suggest adding that individual to a friends at work group. Upon detecting a title change, the system might suggest adding others within a new organizational context to a co-workers group.

In one embodiment, the user relation management component 322 may impose policy rules regarding user relations. For instance, perhaps a request to add a particular topic individual to a particular group may be rejected as improper. For instance, perhaps a particular participant has expressed an interest in keeping his birthday a completely private matter, and not to be shared. The user relation management component 322 may make adjustments to the event types reported regarding that topic individual.

The event filtering and rules management 321 defines which event types are to be included in event feeds for topic individuals in which groups for any given participant. For instance, referring to FIG. 5, for topic individuals 521 and 522 included within group 511, perhaps only a certain event type is reported in the event feed (e.g., birthday events, hiring anniversary events, or the like). For any topic individuals within group 512, perhaps a different subset of event types may be reported for those individuals. Finally, for any individual within groups 513, perhaps a yet different subset of event types are reported in event feeds for those individuals in that group.

In one embodiment, if a topic individual is in more than one group, the superset of all the event types for any group that the topic individual is in may be reported in the event feed. For instance, suppose group 511 corresponds to event types A, B, and C, and group 512 corresponds to event types C, D and E.

The participant 501 would be reported regarding event types A, B, C, D, and E for topic individual 521, who appears in both groups 511 and 512.

Figure 7:
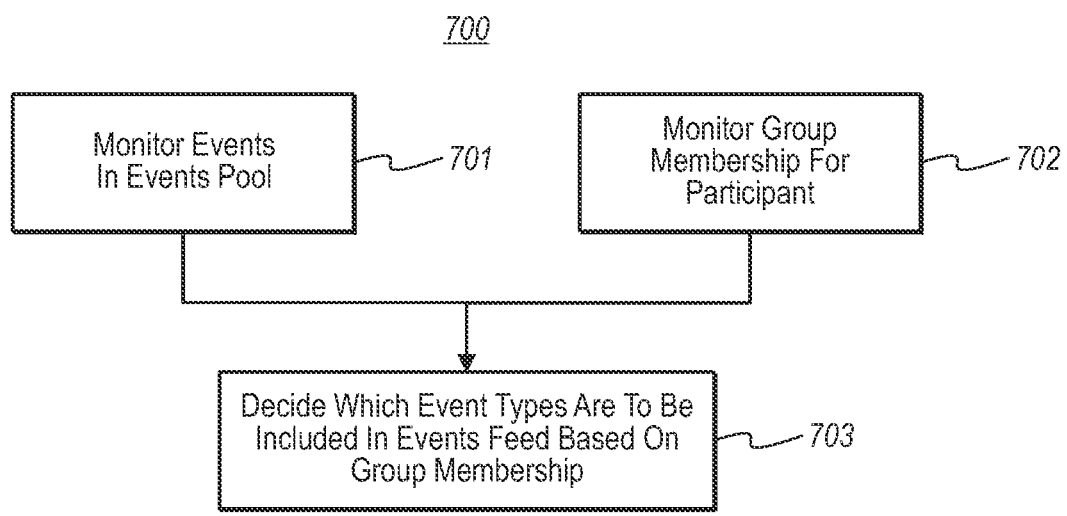
FIG. 7 is a flowchart of a method for preparing to provide an event feed to a participant in a social networking application.

FIG. 7 is a flowchart of a method 700 for preparing to provide an event feed to a participant in a social networking application. The method may be performed by the event feeder component 323 of FIG. 3, which prepares the event feeds for the participant using events in the events pool 310.

Events are tracked regarding a particular topic individual by identifying a topic individual, an event type, and a time for each event (act 701). For instance, the event feeder component 323 may monitor the various events within the events pool for those events that correspond to a topic individual and event type for which the event feeder 323 is to provide in an event feed.

In addition, group memberships for multiple groups for the participant are monitored (act 702). As mentioned previously, this monitoring may be accomplished by the user relation management component 322, and was described using the user relation 500 of FIG. 5 as an example. The acts 701 and 702 are shown in parallel to emphasize that there is no timing relationship between these two acts. The event feeder component 323 then decides for each of the groups, which event types are to be fed to the participant (act 703). The method 700 may be performed for each possible participant in the social networking application.

Figure 8:
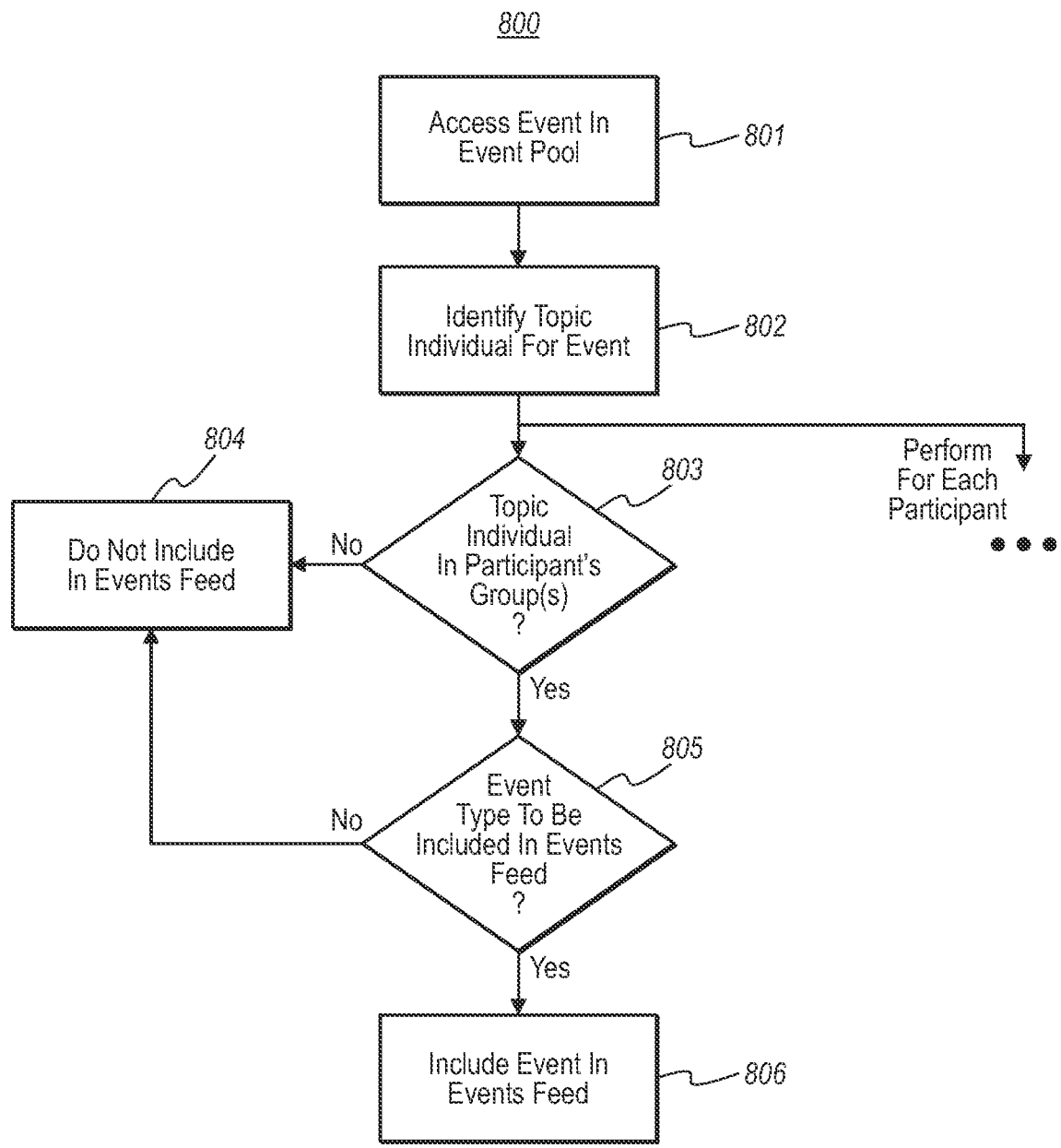
FIG. 8 is a flowchart of a method for filtering an event from the events pool to formulate an event feed.

FIG. 8 is a flowchart of a method 800 for filtering an event from the events pool to formulate an event feed. The method 800 may be performed by the event feeder 323 of FIG. 3, for example. The method 800 is initiated upon accessing an event from the events pool (act 801). The method 800 then determines which topic individual the event is about (act 802). This might be accomplished by reading the topic individual field of the event. The remainder of the method 800 may then be performed for each participant.

Specifically, for any given participant, it is then determined whether the topic individual is within a given group for a particular participant (decision block 803). In making this determination, the specific groups of the participant are identified, and it is determined which groups, if any, the topic individual belongs to for that participant. If the topic individual is not in any of the groups (No in decision block 803), the event will not be included within the event feed for that participant (act 804).

If the topic individual is in at least one of the groups of the participant (Yes in decision block 803), it is then determined whether the event type of the event corresponds to the group into which the topic individual is placed (decision block 805). For instance, referring to FIG. 5, suppose that group 511 corresponds to event types, A, B and C. If the event is regarding topic individual 522, but is of event type D, the event will not be included in the event feed regarding topic individual 522 provided to participant 501. On the other hand, if the event is of event type C, the event will be included in the event feed regarding topic individual 522 provided to participant 501.

If the event type is not the type to be reported (No in decision block 805), the event is not included in the event feed (act 804). If the event type is of the type to be reported (Yes in decision block 805), the event is provided in the event feed (act 806). There may be a particular format in which to present the event in the event feed. The event feeder component 323 extracts a copy of the event from the events pool 310 and presents the event in the correct format in the event feed provided to the participant.

Accordingly, a mechanism for extracting events from an events pool and providing an associated event feed to a participant is described. Referring to FIG. 3, the last remaining component to describe is the user interface 324. In one example embodiment, the user interface 324 is provided as a Web interface.

Figure 9:
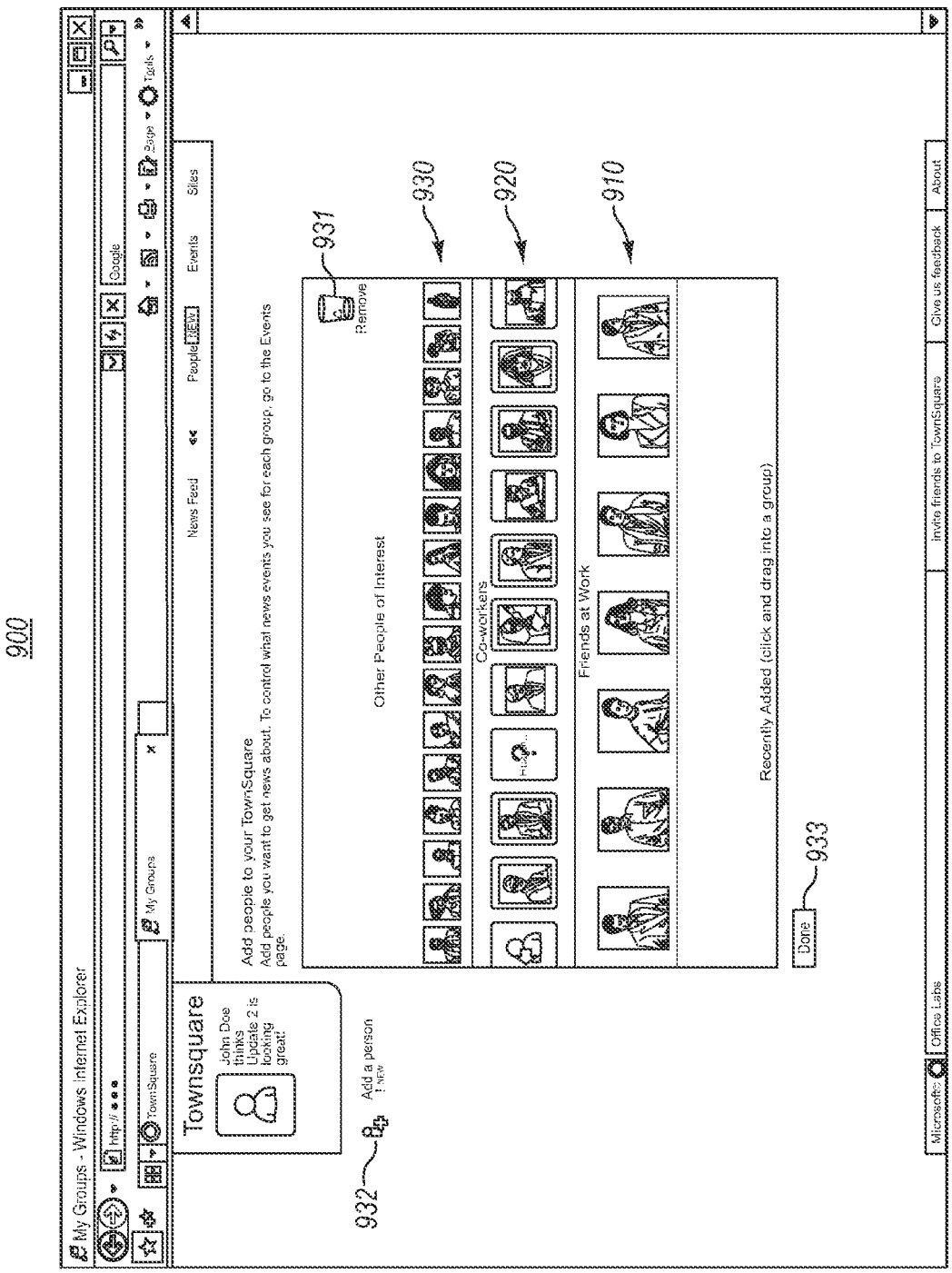
FIG. 9 illustrates an example user interface that allows a participant in a social networking application to edit membership in the participant's social groups.

FIG. 9 illustrates an example user interface 900 that shows how a participant may view and edit his or her group memberships. This example, as with the other user interface examples provided herein, is one of a countless variety of ways that the user interface may be set up, as will be apparent to one of ordinary skill in the art after having reviewed this description. Only a few user interface examples are provided in order to avoid unnecessarily complicating this description with specific implementations that are much narrower than the broadest concept.

The example user interface 900 shows pictures of each of the topic individuals categorized by group. In this example, the groups are Friends at Work, Co-workers, and Other People of Interest. The pictures or other representations of Friends at Work are illustrated in section 910 of the user interface 900, and are relatively large. The pictures of Co-workers are moderately sized and included in section 920 of the user interface 900. The pictures of Other People of Interest are smallest of all and included in section 930 of the user interface 900. The differing size of the pictures for different groups is to 1) distinguish one group from another, and 2) emphasize an estimation of the importance of event feeds for topic individuals in that group.

In order to change a topic individual from one group to another, the picture or other representation for that individual may simply be dragged and dropped into another group. Upon selection of the "Done" control 933, the user relations management component 323 of FIG. 3 may be updated, thereby causing a quick change in the event feed provided to the participant.

The remove control 931 may be used to remove a topic individual from a group. A picture of a topic individual might be, for example, dragged and dropped onto the remove control 931. The "add a person control" 932 permits the user to select an individual from a group of available individuals. The add a person control 932 might also allow the participant to view suggested additions to one or more of the participant's groups.

Figure 10:
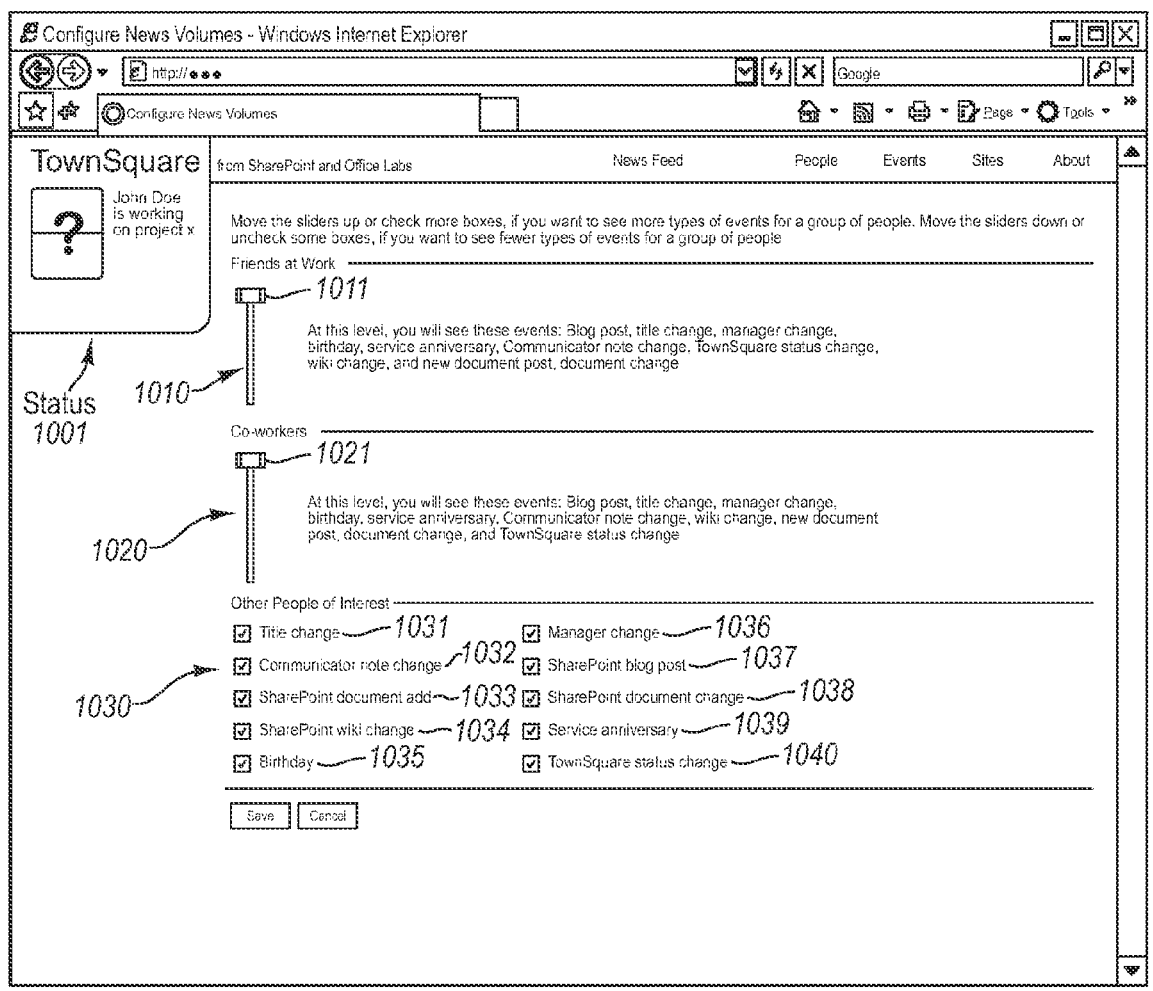
FIG. 10 illustrates an example user interface that allows a participant to configured that types of events that are to be received by group.

FIG. 10 illustrates a user interface 1000 that allows the participant to edit the types of events that are received for each group. Once again, the example groups are Friends at Work corresponding to portion 1010 of the user interface 1000, Co-workers corresponding to portion 1020, and Other People of Interest corresponding to portion 1030. The types of events for Friends at Work and Co-Workers may be adjusted by using the sliders 1011 and 1021, respectively. As the slider is moved downward, there are fewer event types that are reported for that group. Of course, there are a myriad of other ways that event types may be specified. This is just an example.

In this example, the identity of which events types drop off as the slider is moved down may be the result of expectation regarding what event types are important for topic individuals in that category. For instance, birthdays may be a very important event type for Friends at Work, but less so for Co-workers, and perhaps not important at all for Other People of Interest. Accordingly, as the slider is moved down, the Birthday event type would disappear sooner for the Co-worker group as compared to the Friends at Work group.

The portion of the Other People of Interest 1030 shows another way of specifying event types for a particular group. Each event type now corresponds to a checkbox. In this example, a Title Change event corresponds to check box 1031, a Communicator note change event corresponds to check box 1032, a SharePoint document add even corresponds to check box 1033, a SharePoint Wiki change event corresponds to check box 1034, a Birthday event corresponds to check box 1035, a Manager change event corresponds to check box 1036, a SharePoint blog post corresponds to check box 1037, a SharePoint document change event corresponds to check box 1038, a Service anniversary event corresponds to check box 1039. A Status change event corresponds to check box 1040. This allows the participant to select specifically what event types are to be received for event feeds for topic individuals in a particular group. The status indicator 1001 allows the participant to enter a status of the participant.

Figure 11:
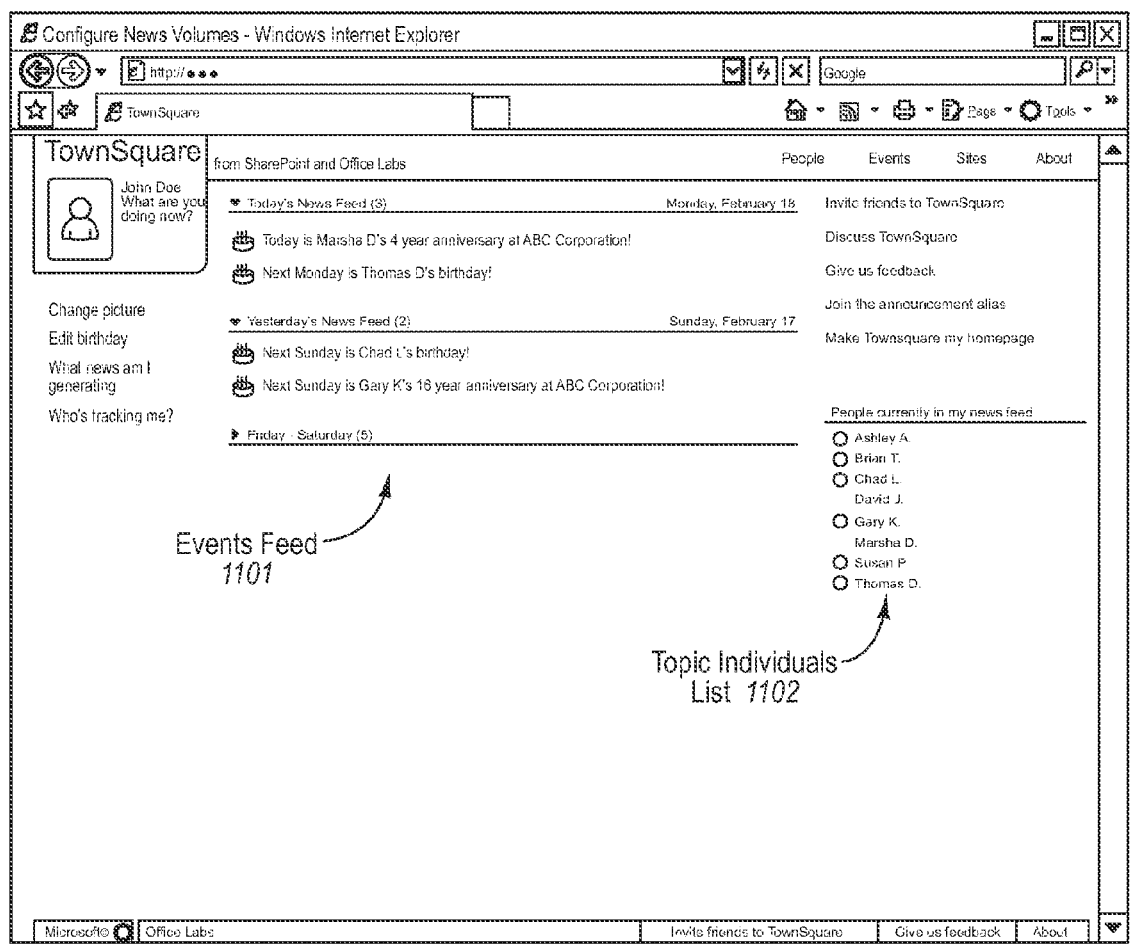
FIG. 11 illustrates an example user interface in which an event feed is presented to the participant.

FIG. 11 illustrates a user interface 1100 in which an event feed may be presented to the participant. The user interface includes an event feed portion 1101 that lists the events related to topic individuals. This event feed was provided by the event feeder component 323 of FIG. 3. A topic individuals list portion 1102 lists the topic individuals that have events in the event feed. In one embodiment, the user may comment on and/or perhaps rate a particular event. These comments and rating may be tracked within the event pool and correlated with the event, and provided with the corresponding event when that event is again used to construct an event feed.

Accordingly, the principles described herein provide for a powerful mechanism for social networking in which event feeds regarding topic individuals may be extracted from disparate locations for consolidated and convenient presentation to the user.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for presenting a user interface to a social networking participant in an enterprise-based social networking application, the method comprising:
an act of a computer system, which includes one or more processors, representing a default network for an enterprise within the user interface presented to the social networking participant, the default network comprising a plurality of groups of individuals of the enterprise, each of the plurality of groups of individuals being automatically populated with one or more of the individuals of the enterprise based on a corresponding organizational context derived from one or more information systems of the enterprise, each corresponding organizational context representing a different type of relation between the social networking participant and the one or more of the individuals of the enterprise that are members of a same corresponding group, at least one corresponding organizational context being formulated based on event information related to the individuals of the enterprise, the event information related to the individuals of the enterprise being gathered automatically using a data collection component that comprises a plurality of collector modules, each collector module comprising at least one adaptor module configured to gather event information from a distinct type of information system within the enterprise;
an act of the computer system representing the individuals of the enterprise in the user interface in a manner that individuals that are members of the same corresponding group are displayed as being associated with the same corresponding group, including displaying at least one of the individuals in a particular group in a manner that the at least one of the individuals is displayed as being associated with the particular group, wherein the at least one of the individuals is not a social networking participant of the enterprise-based social networking application; and
an act of the computer system providing an input mechanism that permits the participant to change group membership, the input mechanism permitting the participant to change group membership of the at least one of the individuals shown being associated with the particular group to a different group, wherein when the enterprise-based social networking application is configured to display event feed data for the at least one of the individuals in connection with an event feed for the different group.

2. A method in accordance with claim 1, wherein the input mechanism is a drag and drop input mechanism whereby the participant may drag a representation of an individual from one group to another, thus changing membership of the individual to a different group.

3. A method in accordance with claim 1, wherein the input mechanism is a drag and drop input mechanism whereby the participant may drag a representation of an individual from a pool of individuals into a group of the plurality of groups, thus creating membership of the individual within the group.

4. A method in accordance with claim 1, wherein representations of individuals are illustrated differently for one group as compared to another.

5. A method in accordance with claim 4, wherein representations of individuals in one group of the plurality of groups are shown larger as compared to representations of individuals in another group of the plurality of groups.

6. A method in accordance with claim 1, wherein the plurality of groups comprise a co-workers group that is automatically populated with one or more of the individuals of the enterprise in a same organizational group within the enterprise as the social networking participant using event information gathered by the collector module from an information system of the enterprise.

7. A method in accordance with claim 1, wherein the plurality of groups comprises a friends group that is automatically populated with one or more of the individuals of the enterprise who communicate with the social networking participant.

8. A method in accordance with claim 1, wherein at least one of the individuals of the enterprise is shown as being associated with more than one group.

9. A method in accordance with claim 1, further comprising:
an act of the computer system receiving user input via the input mechanism, the user input changing group membership of the at least one of the individuals, the user input also adding the at least one of the individuals to another group in addition to the particular group.

10. A method in accordance with claim 1, further comprising:
an act of the computer system receiving user input via the input mechanism, the user input removing the at least one of the individuals from the particular group.

11. A method in accordance with claim 1, wherein the input mechanism comprises a first input mechanism, and wherein the method further comprises:

an act of the computer system providing a second input mechanism that permits the participant to edit types of events that are to be displayed for each of the plurality of groups.

12. A method in accordance with claim 11, wherein the second input mechanism comprises one or more of a slider control or a checkbox.

13. A method in accordance with claim 1, wherein the plurality of groups comprise asymmetric groups, such that an individual can be a member of one of the social networking participant's groups without the social networking participant being a member of one of the individual's groups.

14. A method in accordance with claim 1, further comprising:
an act of the computer system generating a feed for each of the plurality of groups, each feed comprising events related to individuals in the corresponding group.

15. A method in accordance with claim 1, wherein at least one of the plurality of groups comprises an individual outside of the enterprise.

16. A method in accordance with claim 1, wherein the plurality of groups comprises a group that is automatically populated with one or more of the individuals of the enterprise who report directly to the social networking participant using event information gathered by the collector module from an information system of the enterprise.

17. A method in accordance with claim 1, wherein event information related to the at least one individual that is not a social networking participant of the enterprise-based social networking application is gathered automatically by the data collection component without the at least one individual interacting with the enterprise-based social networking application.

18. A method in accordance with claim 1, wherein an event feeder component creates default rules that filter events to populate the social networking participant's event feed based on the social networking participant's groups.

19. A method in accordance with claim 18, wherein the event feeder component filters out at least one event of an individual associated with a particular social networking participant's group based on attributes of the particular group.

20. One or more computer storage devices having stored thereon computer executable instructions that, when executed by one or more processors of a computer system, implement a method for presenting a user interface to a social networking participant in an enterprise-based social networking application, the method comprising:
an act of showing a default network for an enterprise within the user interface presented to the social networking participant, the default network comprising a plurality of groups of individuals of the enterprise, each of the plurality of groups of individuals being automatically populated with one or more of the individuals of the enterprise based on a corresponding organizational context derived from one or more information systems of the enterprise, each corresponding organizational context representing a different type of relation between the social networking participant and the one or more of the individuals of the enterprise that are members of a same corresponding group, at least one corresponding organizational context being formulated based on event information related to the individuals of the enterprise, the event information related to the individuals of the enterprise being gathered automatically using a data collection component that comprises a plurality of collector modules, each collector module comprising at least one adaptor module configured to gather event information from a distinct type of information system within the enterprise;
an act of showing the individuals of the enterprise in the user interface in a manner that individuals that are members of a particular group are shown to be associated with the particular group, including showing at least one of the individuals that is a member of the particular group in a manner that the at least one of the one or more individuals is shown associated with the particular group, wherein the at least one of the individuals is not a social networking participant of the enterprise-based social networking application; and
an act of providing an input mechanism that permits the participant to change group membership, the input mechanism permitting the participant to change group membership of the at least one of the individuals shown being associated with the particular group to a different group, wherein when the enterprise-based social networking application is configured to display event feed data for the at least one of the individuals in connection with an event feed for the different group.

21. A computer system, comprising:
one or more processors; and
one or more computer storage media storing executable instructions that, when executed by the one or more processors, implement a method for presenting a user interface to a social networking participant in an enterprise-based social networking application, the method comprising:
presenting a default network for an enterprise within the user interface presented to the social networking participant, the default network comprising a plurality of groups of individuals of the enterprise, each of the plurality of groups of individuals being automatically populated with one or more of the individuals of the enterprise based on a corresponding organizational context derived from one or more information systems of the enterprise, each corresponding organizational context representing a different type of relation between the social networking participant and the one or more of the individuals of the enterprise that are members of a same corresponding group, at least one corresponding organizational context being formulated based on event information related to the individuals of the enterprise, the event information related to the individuals of the enterprise being gathered automatically using a data collection component that comprises a plurality of collector modules, each collector module comprising at least one adaptor module configured to gather event information from a distinct type of information system within the enterprise;
presenting the individuals of the enterprise in the user interface in a manner that individuals that are members of a particular group are shown to be associated with the particular group, including presenting at least one of the individuals that is a member of the particular group in a manner that the at least one of the one or more individuals is shown associated with the particular group, wherein the at least one of the individuals is not a social networking participant of the enterprise-based social networking application; and
providing an input mechanism that permits the participant to change group membership, the input mechanism permitting the participant to change group membership of the at least one of the individuals shown being associated with the particular group to a different group, wherein when the enterprise-based social networking application is configured to display event feed data for the at least one of the individuals in connection with an event feed for the different group.

* * * * *